United States Patent
Sugiura et al.

(10) Patent No.: US 7,040,796 B2
(45) Date of Patent: May 9, 2006

(54) ILLUMINATION DEVICE AND LIQUID CRYSTAL DISPLAY DEVICE

(75) Inventors: Takuro Sugiura, Fukushima-ken (JP); Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 274 days.

(21) Appl. No.: 10/619,958

(22) Filed: Jul. 14, 2003

(65) Prior Publication Data

US 2004/0022515 A1    Feb. 5, 2004

(30) Foreign Application Priority Data

Jul. 17, 2002   (JP) ............................... 2002-208207

(51) Int. Cl.
F21V 7/04 (2006.01)

(52) U.S. Cl. ...................... 362/608; 362/621; 362/622; 362/612; 362/626; 362/624; 362/628; 362/561

(58) Field of Classification Search ................ 362/26, 362/561, 621, 622, 612, 626, 624, 628, 608; 349/65; 385/146

See application file for complete search history.

(56) References Cited

U.S. PATENT DOCUMENTS

| | | | | |
|---|---|---|---|---|
| 5,668,913 A | * | 9/1997 | Tai et al. ..................... | 385/146 |
| 6,461,007 B1 | * | 10/2002 | Akaoka ....................... | 362/610 |
| 6,636,283 B1 | * | 10/2003 | Sasagawa et al. ............ | 349/65 |
| 6,672,734 B1 | * | 1/2004 | Lammers ..................... | 362/612 |
| 6,752,506 B1 | * | 6/2004 | Suzuki et al. ............... | 362/610 |
| 6,802,619 B1 | * | 10/2004 | Ohizumi et al. ............ | 362/603 |
| 6,883,924 B1 | * | 4/2005 | Maeda et al. ................. | 362/26 |
| 2002/0008969 A1 | * | 1/2002 | Mabuchi et al. .............. | 362/31 |
| 2002/0030986 A1 | * | 3/2002 | Egawa et al. ................. | 362/31 |
| 2002/0080433 A1 | * | 6/2002 | Baba ............................ | 359/26 |
| 2003/0031006 A1 | * | 2/2003 | Huang ......................... | 362/26 |

FOREIGN PATENT DOCUMENTS

JP     JP 11-271767 A1    10/1999

* cited by examiner

*Primary Examiner*—John Anthony Ward
*Assistant Examiner*—Jacob Y. Choi
(74) *Attorney, Agent, or Firm*—Brinks Hofer Gilson & Lione

(57) ABSTRACT

In a front light, an intermediate light guide protrudes from a light guide plate toward a light emitting element in the direction along a light incident face of the light guide plate. A side face of the intermediate light guide opposing the light incident face serves as an emergent face from which light from the light emitting element is emitted to the light guide plate, and an outer side face remote from the emergent face serves as a reflecting face for reflecting light propagating inside the intermediate light guide. The outer side face of the intermediate light guide is provided with a prism face having a plurality of grooves of wedge-shaped cross section, and a reflective film formed thereon. The prism face is provided distant from an end face of the intermediate light guide close to the light emitting element.

13 Claims, 11 Drawing Sheets

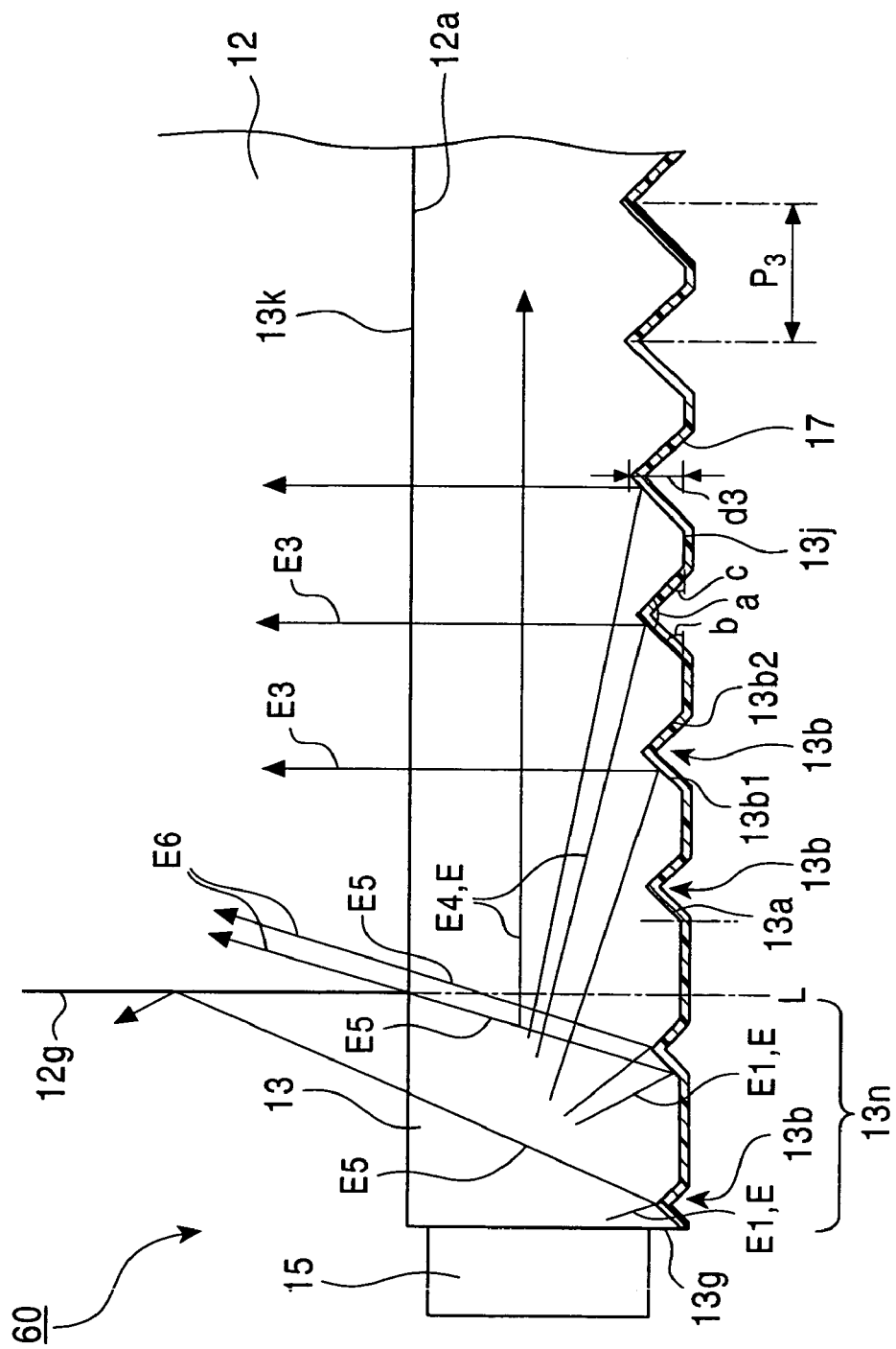

ILLUMINATION DEVICE AND LIQUID CRYSTAL DISPLAY DEVICE

BACKGROUND OF THE INVENTION

1. Field of the Invention

The present invention relates to an illumination device and a liquid crystal display device, and more particularly, to the configuration of an illumination device that achieves a highly uniform distribution of the amount of emitted light with a single light source, and to the configuration of a liquid crystal display device using the illumination device.

2. Description of the Related Art

Front lights of reflective liquid crystal display devices have been formed in a unit including a light source, an intermediate light guide, a light guide plate, and a case member having a reflective inner surface to hold these members together.

FIG. 13A is a perspective structural view of a conventional liquid crystal display device, and FIG. 13B is a plan view of a front light provided in the liquid crystal display device shown in FIG. 13A, as viewed from the viewing side. The liquid crystal display device shown in these figures includes a liquid crystal display unit 120, and a front light 110 disposed on the front side of the liquid crystal display unit 120. Although not shown in detail, the liquid crystal display unit 120 is a reflective liquid crystal display unit that performs display by reflecting light incident from its front side, and holds a liquid crystal layer 123 between an upper substrate 121 and a lower substrate 122 opposing each other. By controlling the alignment state in the liquid crystal layer 123, the light transmitting state is changed to perform display.

The front light 110 includes a flat light guide plate 112, a bar-shaped intermediate light guide 113 disposed at a side face (light incident face) 112a of the light guide plate 112, and a light emitting element 115 formed of a point light source, such as a white LED (Light Emitting Diode), and disposed at one end face (left end face in the figures) 113g of the intermediate light guide 113. An upper surface of the light guide plate 112 serves as a reflecting surface 112c on which a plurality of prism grooves 114 of wedge-shaped cross section are formed in parallel and in stripes in plan view, and a lower surface thereof serves as an emergent surface 112b from which illumination light for illuminating the liquid crystal display unit 120 is emitted. Each of the prism grooves 114 is composed of a gently inclined face 114a and a sharply inclined face 114b. The inclination angle $\theta_1$ of the gently inclined face 114a is set at a fixed value within the range of 5° to 35°, and the inclination angle $\theta_2$ of the sharply inclined face 114b is set at a fixed value larger than the inclination angle $\theta_1$ of the gently inclined faces 114a. The pitch P of the prism grooves 114 is fixed in the plane of the reflecting surface 112c. The depth of the prism grooves 114 is also fixed in the plane of the reflecting surface 112c. The length of an outer side face 113a of the intermediate light guide 113 is equal to the length of the light incident face 112a of the light guide plate 112, and the end face 113g of the intermediate light guide 113 is flush with an end face 112g of the light guide plate 112 close to the light emitting element 115. A prism face 113f is formed on the outer side face 113a of the intermediate light guide 113 (remote from the light guide plate 112) in the lengthwise direction of the outer side face 113a (from the end face 113g close to the light emitting element 15 toward an end face 113h on the remote side) to reflect light propagating inside the intermediate light guide 113 in order to change the propagating direction.

Therefore, in the front light 110 shown in FIG. 13, light emitted from the light emitting element 115 is introduced into the intermediate light guide 113 through the end face 113g, is caused by the prism face 113f to change the propagating direction, and is introduced into the light guide plate 112 through the side face 112a. The light is reflected by the upper reflecting surface (inner surface) of the light guide plate 112 having the prism grooves 114 to change the propagating direction thereof, and is emitted from the emergent surface (lower surface) of the light guide plate 112 toward the liquid crystal display unit 120.

In portable electronic devices such as personal digital assistants and portable game machines, since the battery driving time has a great influence on the ease of use, liquid crystal display devices used as display sections in the electronic devices have adopted a single-LED front light having only a single light emitting element, as in the front light 110 shown in FIGS. 13A and 13B, in order to reduce the power consumption of the front light. That is, the number of light emitting elements is limited to reduce the power consumption. Furthermore, with size reduction of the portable electronic devices, there has been a request to reduce the thickness of the front light to approximately 1 mm.

It is, however, substantially impossible for such a single-LED front light to uniformly and brightly illuminate a large display region having a diagonal size of several inches or more by a combination of the thin light guide plate and the single light emitting element. That is, in a case in which the light emitting element 115 is provided on one side of the front light 110 shown in FIG. 15, it is first necessary to make incident light uniform in the lengthwise direction of the side face 112a of the light guide plate 112 by the intermediate light guide 113 in order to uniformly guide light from the light emitting element 115 to the light guide plate 112. It is, however, difficult for the intermediate light guide 113 to make light incident on the light guide plate 112 uniform. Therefore, it is difficult to obtain uniform light emitted from the entire emergent surface 112b, and to uniformly illuminate the display region of the liquid crystal display unit 120 without causing variations in luminance. This sometimes reduces display visibility. In a particularly marked case, a dark portion 128 shaped like a strip in plan view is formed near the end face 112g of the light guide plate 112 on the side of the light emitting element 115, as shown in FIG. 13B. Consequently, the emitted light is not uniform, and visibility of the liquid crystal display device is reduced.

In a double-LED front light in which a light emitting element is also disposed at the other end face 113h (on the right side) of the intermediate light guide 113, the amount of light near the left end face 112g of the light guide plate 112 is supplemented by light emitted from the light emitting element, and brightness is increased. However, the power consumption is higher than in the single-LED front light.

While there is an increasing demand for a front light using a single light emitting element as a light source in this way, a thin front light that can uniformly and brightly illuminate a large area has not yet been achieved.

SUMMARY OF THE INVENTION

The present invention has been made to solve the above problems, and an object of the invention is to provide an illumination device that enhances the uniformity of emergent light and that achieves bright illumination with low power consumption.

Another object of the present invention is to provide an illumination device that enhances the uniformity of emergent light and that uniformly and brightly illuminates a large area with low power consumption.

A further object of the present invention is to provide a liquid crystal display device that has the above illumination device and that achieves high luminance and high display quality.

As a result of intensive studies and examinations for overcoming the above problems, the present inventors found that the above problems arose in the conventional illumination device for the following reasons: That is, the amount of light (straight incident light) close to the straight direction (lengthwise direction of the intermediate light guide), of light introduced from the light emitting element into the intermediate light guide, is larger than the amount of light (diagonal incident light) deviating from the straight direction. Since the diagonal incident light is close to the light emitting element, even when it is reflected into the light guide plate by the reflecting face of the outer side face of the intermediate light guide, since the amount of the light is small, a dark portion is formed near the end face of the light guide plate close to the light emitting element.

After further studies and examinations, the present inventors found that the above problems could be overcome by causing less diagonal incident light with low intensity close to the light emitting element to enter the light guide plate and causing more straight emergent light with high intensity to enter the light guide plate.

In order to achieve the above objects, according to an aspect, the present invention provides an illumination device including a light guide plate, an intermediate light guide disposed along one side face of the light guide plate, and a light emitting element disposed at an end face in the lengthwise direction of the intermediate light guide, wherein the side face of the light guide plate serves as a light incident face from which light is introduced, the light emitted from the light emitting element is introduced into the light guide plate through the intermediate light guide and the light incident face of the light guide plate, and the light propagating inside the light guide plate is emitted from one surface of the light guide plate, and wherein the intermediate light guide protrudes from the light guide plate in a direction along the light incident face of the light guide plate toward the light emitting element, a side face of the intermediate light guide opposing the side face of the light guide plate serves as an emergent face from which the light from the light emitting element is emitted toward the light guide plate, and an outer side face of the intermediate light guide remote from the emergent face serves as a reflecting face for reflecting the light propagating inside the intermediate light guide.

In the illumination device of the present invention having the above features, the intermediate light guide protrudes from the light guide plate toward the light emitting element in the direction along the light incident face of the light guide plate. Even when the single light emitting element is provided at one end face of the intermediate light guide, low-intensity diagonal incident light close to the light emitting element, of light introduced from the light emitting element into the intermediate light guide, hardly enters the light guide plate after being reflected by the reflecting face of the protruding portion of the intermediate light guide. Much high-intensity straight incident light propagates inside the intermediate light guide plate, is reflected by the reflecting face, is emitted from the emergent face of the intermediate light guide remote from the reflecting face, and enters the light guide plate. Therefore, compared with the conventional illumination device in which the end face of the intermediate light guide close to the light emitting element is flush with the end face of the light guide plate close to the light emitting element, a dark portion formed near the end face of the light guide plate close to the light emitting element can be reduced, the uniformity of light emitted from one surface (emergent surface) of the light guide plate can be enhanced, and bright illumination and low power consumption are achieved.

The outer side face of the intermediate light guide may be provided with a prism face having a plurality of grooves of wedge-shaped cross section, and a reflective film formed on the prism face, or may be provided with an uneven face having a plurality of minute irregularities, and a reflective film formed on the uneven face. The reflective film may also be formed on a portion of the outer side face of the intermediate light guide between the end face of the intermediate light guide close to the light emitting element and the prism face or the uneven face on which the prism face or the uneven face is not formed. The cross section of the uneven face having a plurality of minute irregularities may include curves inclined continuously or discontinuously.

Light introduced from the light emitting element into the intermediate light guide propagates inside the intermediate light guide, is reflected by the prism face or the uneven face, and is emitted from the face remote from the prism face or the uneven face (emergent face of the intermediate light guide). Since the reflective film is formed on the prism face or the uneven face, it increases the reflectance of the prism face or the uneven face, and increases the amount of light reflected toward the face remote from the prism face or the uneven face (emergent face of the intermediate light guide). In particular, the amount of straight incident light from the light emitting element to be reflected toward the light incident face of the light guide plate can be increased, and the amount of straight incident light that enters the light guide plate can be increased. As a result, the luminance of the illumination device can be enhanced.

Preferably, the prism face or the uneven face of the intermediate light guide is provided distant from the end face of the intermediate light guide close to the light emitting element.

In the illumination device of the present invention in which the intermediate light guide protrudes from the light guide plate in the direction along the light incident face of the light guide plate, a dark portion formed near the end face of the light guide plate close to the light emitting element can be made smaller than in the conventional illumination device, as described above. Depending on the condition for forming the prism face or the uneven face on the outer side face of the protruding portion of the intermediate light guide, for example, in a case in which the prism face or the uneven face reaches the end face of the intermediate light guide close to the light emitting element (in other words, the prism face or the uneven face is close to the light emitting element), while the amount of diagonal incident light from the light emitting element is small, it is reflected as diagonal reflected light by the prism face or the uneven face toward the emergent face of the intermediate light guide.

Light emitted through the intersection of the end face of the light guide plate and the emergent face of the intermediate light guide and light emitted from the side offset from the intersection away from the light emitting element, of the diagonal reflected light, is introduced as diagonal incident light into the light guide plate. In contrast, diagonal reflected light emitted from the side offset from the intersection toward the light emitting element does not enter the light guide plate. Therefore, light and dark are formed, respectively, on both sides of the diagonal incident light passing through the intersection, and a triangular dark portion is sometimes formed near the end face of the light guide plate close to the light emitting element. The diagonal reflected light emitted from the side offset from the intersection toward the light emitting element is diffused by the end face of the light guide plate, and this sometimes causes bright lines and worsens the appearance.

By forming the prism face or the uneven face of the intermediate light guide distant from the end face of the intermediate light guide close to the light emitting element, as described above, diagonal incident light from the light emitting element enters the portion of the outer side face in which the prism face or the uneven face is not formed (portion between the light emitting element and the prism face or the uneven face), is emitted as a delivery component into the intermediate light guide, and propagates inside the intermediate light guide. The light is reflected by the prism face or the uneven face, is emitted from the emergent face of the intermediate light guide, and is introduced as straight incident light into the light guide plate. Straight incident light from the light emitting element propagates inside the intermediate light guide, is reflected by the prism face or the uneven face, is emitted from the emergent face of the intermediate light guide, and is introduced as straight incident light into the light guide plate.

Since this can prevent diagonal incident light from entering the light guide plate and can eliminate diagonal reflected light emitted from the side offset from the intersection toward the light emitting element, a dark portion is not formed near the end face of the light guide plate close to the light emitting element, variations in luminance in the diagonal direction are reduced, and bright lines due to the diagonal incident light are reduced, and the appearance is improved. In such an illumination device, even when the single light emitting element is used, the uniformity of emergent light is high, and a large area can be uniformly and brightly illuminated with low power consumption.

Preferably, the prism face or the uneven face on the outer side face of the intermediate light guide extends from a position at a distance within the range of −1 mm to +0.5 mm from an extension line of the end face of the light guide plate close to the light emitting element that reaches the outer side face of the intermediate light guide, wherein the symbol "−" indicates a side offset from the extension line toward the light emitting element, and the symbol "+" indicates a side offset from the extension line away from the light emitting element. This is because variations in luminance in the diagonal direction and bright lines due to diagonal reflected light emitted from the intermediate light guide can be reduced, and a strip-shaped dark portion can be prevented from being formed near the end face of the light guide plate close to the light emitting element.

More preferably, the prism face or the uneven face on the outer side face of the intermediate light guide extends from a position at a distance within the range of −0.5 mm to +0.5 mm from the extension line, because variations in luminance in the diagonal direction and bright lines due to diagonal reflected light emitted from the intermediate light guide can be reduced, a dark portion can be prevented from being formed near the end face of the light guide plate close to the light emitting element, and the uniformity of light emitted from the light guide plate can be enhanced. In order to further enhance the above effects, it is still more preferable that the prism face or the uneven face on the outer side face of the intermediate light guide extend from the extension line of the end face of the light guide plate.

Preferably, the pitch of the grooves of wedge-shaped cross section provided on the outer side face of the intermediate light guide exponentially or quadratically decreases away from the light emitting element. This is because light emitted from the intermediate light guide can be efficiently supplied to the light guide plate, the uniformity of the light emitted from the intermediate light guide can be enhanced, and the amount of light emitted from the emergent surface of the light guide plate and the uniformity of the light can be increased.

Preferably, the depth of the grooves of wedge-shaped cross section provided on the outer side face of the intermediate light guide exponentially or cubicly increases away from the light emitting element. This is because the distribution of the amount of emergent light in the longitudinal direction of the intermediate light guide can be made uniform.

Preferably, each of the grooves of wedge-shaped cross section has a pair of inclined faces for reflecting light, and the angle defined by the inclined faces is within the range of 105° to 115°. In this case, the amount of light emitted toward the light incident face of the light guide plate can be increased, the utilization efficiency of the light emitting element can be enhanced, and the luminance of the illumination device can be increased. When the angle defined by the two inclined faces is less than 105°, the uniformity of light emitted from the intermediate light guide is lessened. When the angle exceeds 115°, the luminance of the illumination device is decreased.

Preferably, the other surface of the light guide plate is provided with a plurality of prism grooves arranged in stripes in plan view and having gently inclined faces and sharply inclined faces inclined more sharply than the gently inclined faces in order to achieve a uniform amount of emergent light in the plane of the light guide plate and to enhance the utilization efficiency of the light source and the luminance.

The extending direction of the prism grooves in the light guide plate may intersect the light incident face. In a case in which an object to be illuminated by the illumination device has periodic shapes or patterns (regular patterns) with a predetermined interval, it is preferable that the intersecting angle of the extending direction of the prism grooves and the light incident face be determined depending on the pitch of the periodic shapes or patterns (regular patterns) with a predetermined interval in the object so that the extending direction of the prism grooves is not parallel to the repetition direction of the regular patterns of the object in order to prevent moiré fringese due to optical interference between the prism grooves of the light guide plate and the shapes or patterns of the object.

According to another aspect, the present invention provides a liquid crystal display device including the above illumination device, and a liquid crystal display unit to be illuminated by the illumination device.

Since the liquid crystal display device includes the illumination device of the present invention, even when the single light emitting element is used in the illumination device, high brightness uniformity and high display visibility are possible. Therefore, high luminance and high display quality can be achieved with low power consumption.

Further objects, features and advantages of the present invention will become apparent from the following description of the preferred embodiments with reference to the attached drawings.

BRIEF DESCRIPTION OF THE DRAWINGS

FIG. 12 is an enlarged structural plan view showing the principal part of a front light provided in a liquid crystal display device according to a third embodiment of the present invention.

DESCRIPTION OF THE PREFERRED EMBODIMENTS

Preferred embodiments of the present invention will be described below with reference to the attached drawings.

First Embodiment

[Overall Configuration of Liquid Crystal Display Device]

Figure 1:
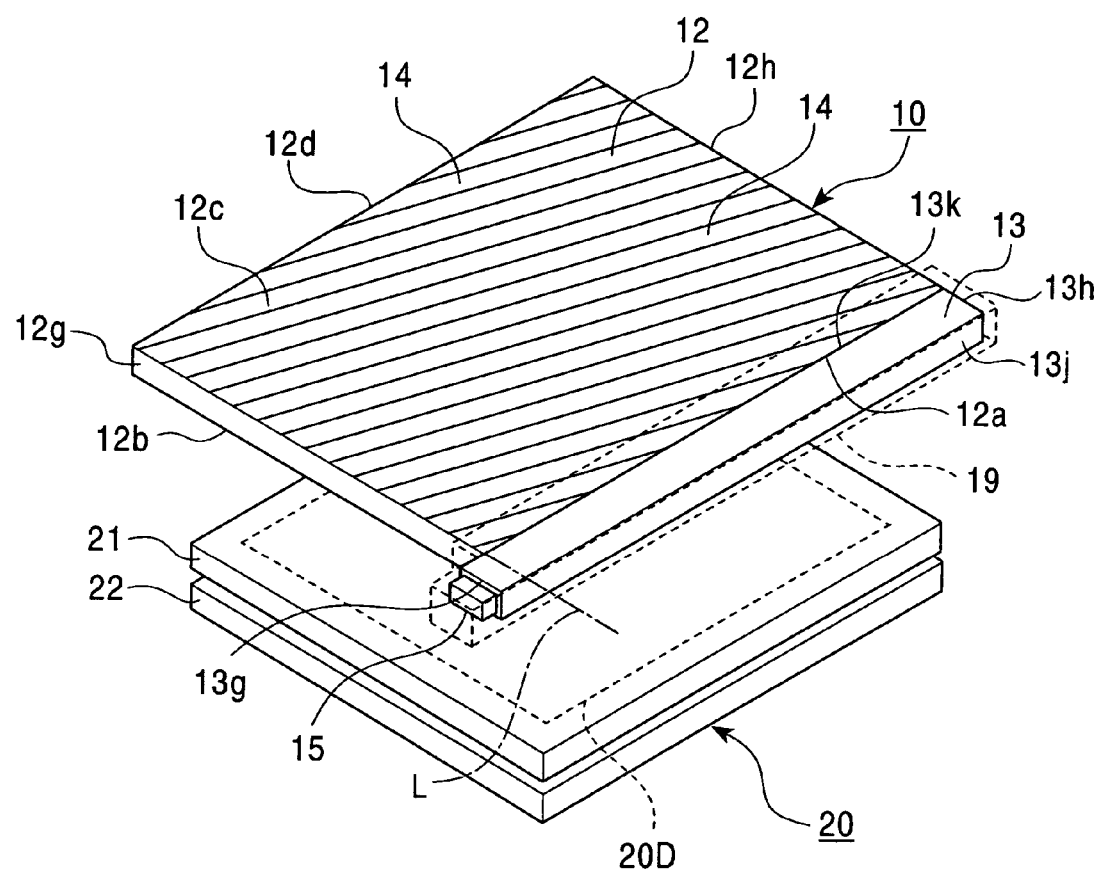
FIG. 1 is a perspective structural view of a liquid crystal display device according to a first embodiment of the present invention.
Figure 2:
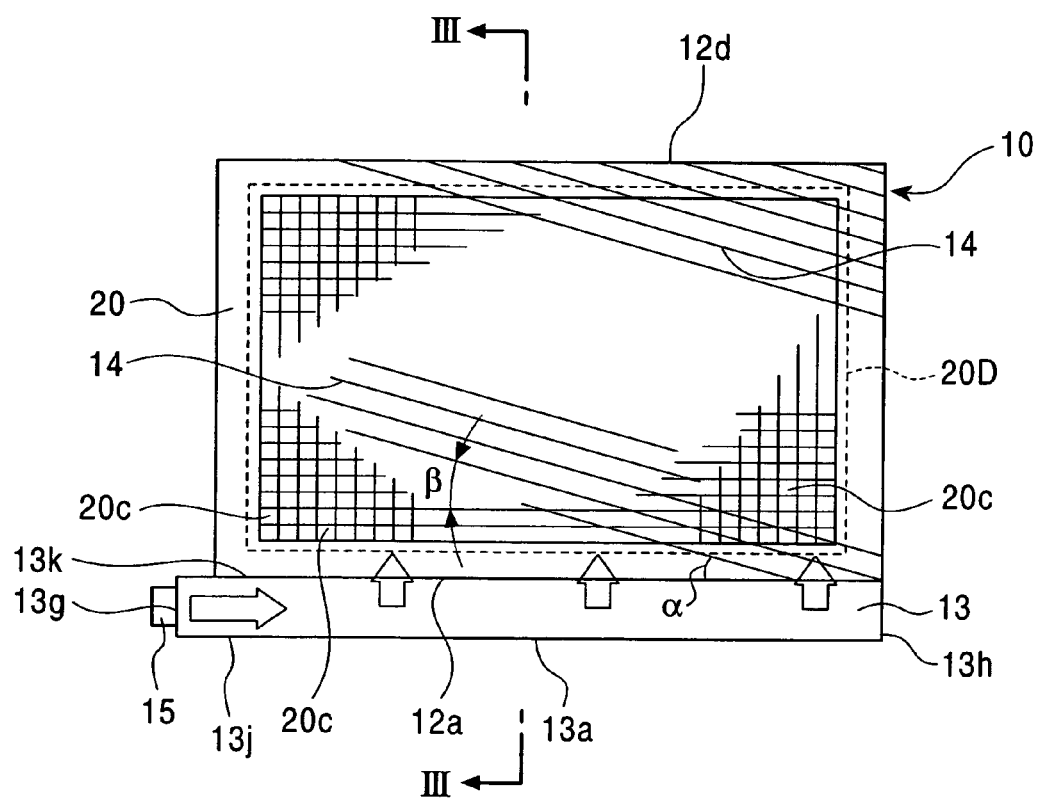
FIG. 2 is a structural plan view of the liquid crystal display device shown in FIG. 1.
Figure 3:
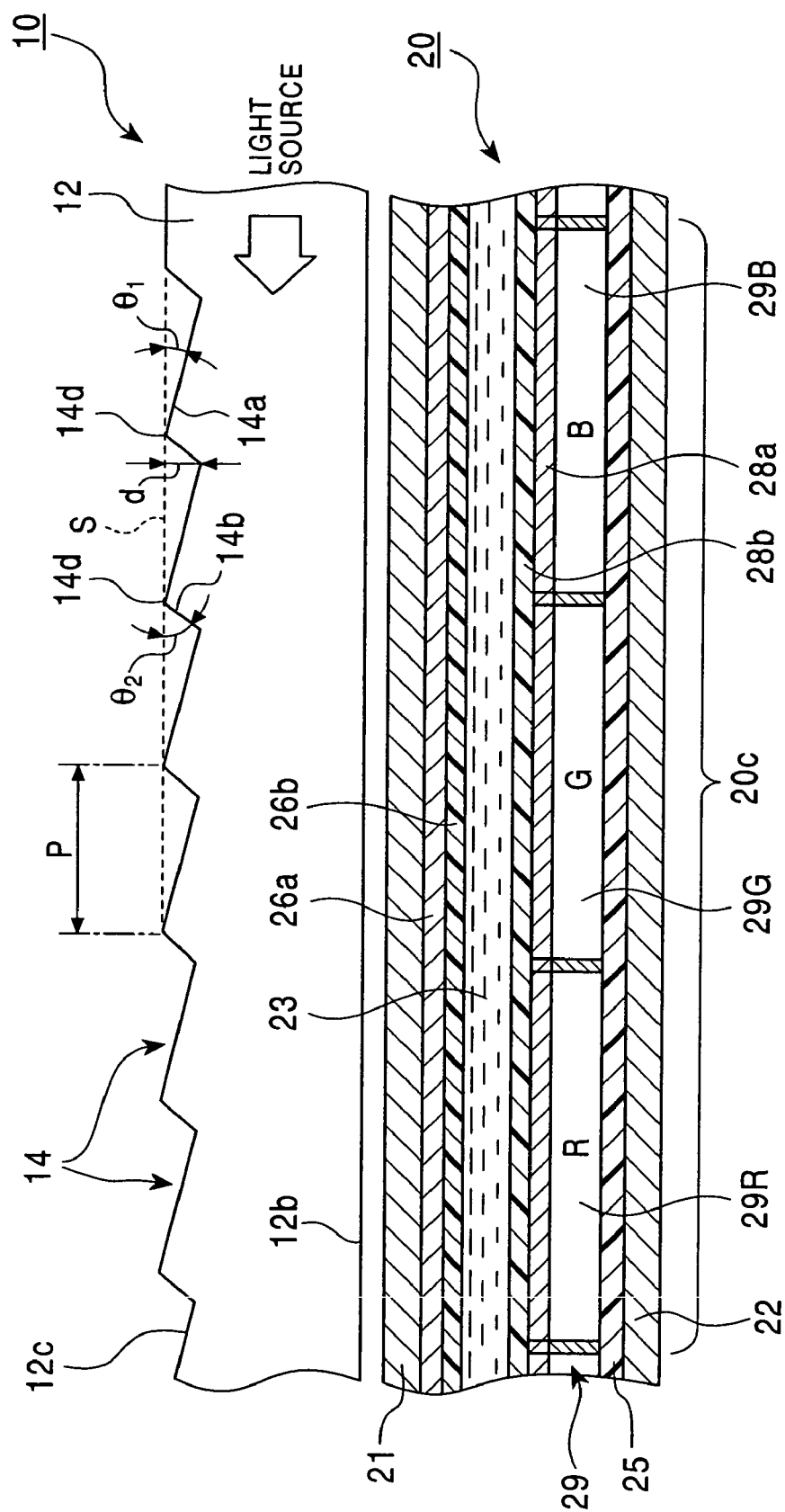
FIG. 3 is a cross-sectional view of the liquid crystal display device, taken along line III—III in FIG. 2.

FIG. 1 is a perspective structural view of a liquid crystal display device according to a first embodiment of the present invention, FIG. 2 is a structural plan view of the liquid crystal display device shown in FIG. 1, and FIG. 3 is a cross-sectional view of the liquid crystal display device, taken along line III—III in FIG. 2. Referring to FIGS. 1 to 3, the liquid crystal display device of the first embodiment includes a front light (illumination device) 10, and a reflective liquid crystal display unit 20 disposed on the back side (lower side in the figures) of the front light 10.

As shown in FIG. 1, the front light 10 includes a substantially flat transparent light guide plate 12, an intermediate light guide 13 disposed along a side face (one side face) 12a of the light guide plate 12, a light emitting element 15 disposed at one end face 13g in the lengthwise direction of the intermediate light guide 13, and a case member (shielding member) 19 attached from the side of the intermediate light guide 13 to cover the intermediate light guide 13, the light emitting element 15, and a side portion of the light guide plate 12. An end portion in the lengthwise direction of the intermediate light guide 13 at which the light emitting element 15 is disposed protrudes from the side face 12a of the light guide plate 12, and the end face 13g of the intermediate light guide 13 is not flush with an end face 12g of the light guide plate 12 close to the light emitting element 15.

That is, in the front light 10 of the first embodiment, the light emitting element 15 and the intermediate light guide 13 constitute a light source, and the side face 12a of the light guide plate 12 serves as a light incident face. As shown in FIG. 2, a plurality of prism grooves 14 are arranged on an outer surface (upper surface in the figures) of the light guide plate 12 so that they are inclined at an angle $\alpha$ to the light incident face 12a at which the intermediate light guide 13 is disposed. In FIGS. 1 and 2, reference numeral 12d denotes a side face (terminal end face) of the light guide plate 12 remote from the light incident face 12a.

The liquid crystal display unit 20 includes an upper substrate 21 and a lower substrate 22 opposing each other. A rectangular region 20D shown by a dotted line in FIG. 1 serves as a display region of the liquid crystal display unit 20, and pixels 20c are formed in a matrix inside the display region 20D, as shown in FIG. 2.

In the liquid crystal display device having the above configuration, the light guide plate 12 is disposed on the display region 20D of the liquid crystal display unit 20, and a display on the liquid crystal display unit 20 can be viewed through the light guide plate 12. In a dark place where external light cannot be obtained, the light emitting element 15 is lighted, and light therefrom is introduced into the light guide plate 12 through the intermediate light guide 13 and the light incident face 12a, and is emitted from a lower surface (one surface) 12b of the light guide plate 12 toward the liquid crystal display unit 20, thereby illuminating the liquid crystal display unit 20.

Next, the structures of the components of the liquid crystal display device of the first embodiment will be described in detail with reference to the drawings.

[Front Light]

The light guide plate 12 of the front light 10 is shaped like a flat plate made of transparent acrylic resin or the like, and is disposed on the display region 20D of the liquid crystal display unit 20 to emit light, emergent from the light emitting element 15, from the lower surface 12b to the liquid crystal display unit 20. As shown in FIG. 3 as a partial sectional view, the upper surface (the other surface, in other words, a surface remote from the liquid crystal display unit 20) of the light guide plate 12 serves as a reflecting surface 12c on which the prism grooves 14 of wedge-shaped cross section are formed in parallel and in stripes in plan view. The lower surface (a surface opposing the liquid crystal display unit 20) of the light guide plate 12 serves as an emergent surface 12b from which illumination light for illuminating the liquid crystal display unit 20 is emitted.

Each of the prism grooves 14 is wedge-shaped in longitudinal cross section, and is composed of a pair of inclined faces inclined relative to a reference plane S of the reflecting surface 12c. One of these inclined faces serves as a gently inclined face 14a, and the other inclined face serves as a sharply inclined face 14b having an inclination angle more than that of the gently inclined face 14a. As shown in FIGS. 1 and 2, the prism grooves 14 are diagonally formed so that the extending direction thereof intersects the side face 12a of the light guide plate 12. Light that propagates inside the light guide plate 12 from the right to the left in FIG. 3 is reflected toward the emergent surface 12b by the sharply inclined faces 14b of the reflecting surface 12c, and is emitted toward the liquid crystal display unit 20 disposed on the back side of the light guide plate 12.

In the front light 10, the inclination angle $\theta_1$ of the gently inclined faces 14a relative to the reference plane S of the reflecting surface 12c shown in FIG. 3 is set to be within the range of 1° to 5°, and the inclination angle $\theta_2$ of the sharply inclined faces 14b is set to be within the range of 41° to 45°. By setting such ranges, light that propagates inside the light guide plate 12 can be efficiently emitted toward the liquid crystal display unit 20, and bright display can be performed. The average luminance of the front light 10 decreases when the inclination angle $\theta_1$ of the gently inclined faces 14a is less than 1°, and the amount of emitted light cannot be made uniform in the plane of the light guide plate 12 when the inclination angle $\theta_1$ exceeds 5°. It is not preferable that the inclination angle $\theta_2$ of the sharply inclined faces 14b be less than 41° or more than 45° because the propagating direction of light reflected by the sharply inclined faces 14b greatly deviates from the direction of the normal to the emergent surface 12b, and the amount of light emitted from the emergent surface 12b (that is, the luminance of the front light 10) decreases. The reference plane S of the reflecting surface 12c includes tops 14d between the adjoining prism grooves 14 of the light guide plate 12.

The pitch P of the prism grooves 14 (interval between the tops 14d or bottoms of the prism grooves 14) is fixed in the plane of the reflecting surface 12c of the light guide plate 12. The depth "d" of the prism grooves 14 (distance between the reference plane S and the bottoms of the prism grooves 14) is also fixed in the plane of the reflecting surface 12c.

The pitch P and depth "d" of the prism grooves 14 do not always need to be fixed in the plane of the reflecting surface 12c. A case in which the pitch P and depth "d" are changed, and a case in which the inclination angles $\theta_1$ and $\theta_2$ of the prism grooves 14 are changed are also included in the technical scope of the present invention.

As shown in FIG. 2, it is preferable that the inclination angle a of the prism grooves 14 formed with the side face 12a of the light guide plate 12 be within the range of 0° to 150°. It is more preferable that the inclination angle α be within the range of 6.5° to 8.5°. By setting such ranges, moiré are rarely produced and the emergent light is highly uniform in the front light 10.

The material of the light guide plate 12 may be composed not only of acrylic resin, but also of a transparent resin material, such as polycarbonate resin or epoxy resin, glass, or the like.

Since the amount of light emitted from the entire light guide plate 12 becomes more uniform as the thickness of the light guide plate 12 increases, it is preferable that the thickness of the light guide plate 12 be more than or equal to 0.8 mm, and more preferable that the thickness be more than or equal to 1.0 mm. Since the luminance obtained when the thickness is more than or equal to 1.2 mm is not substantially different from that when the thickness is within the range of 1.0 mm to 1.5 mm, it is preferable, in terms of thickness reduction of the front light 10, that the upper limit of thickness of the light guide plate 12 be set at 1.5 mm.

The intermediate light guide 13 is a transparent member that is shaped like a quadratic prism along the light incident face 12a of the light guide plate 12. The intermediate light guide 13 is longer than the light guide plate 12 in the direction along the light incident face 12a of the light guide plate 12 toward the light emitting element 15, that is, the intermediate light guide 13 protrudes from the light guide plate 12 toward the light emitting element 15. The light emitting element 15 is disposed at the end face 13g on the protruding side.

Figure 4:
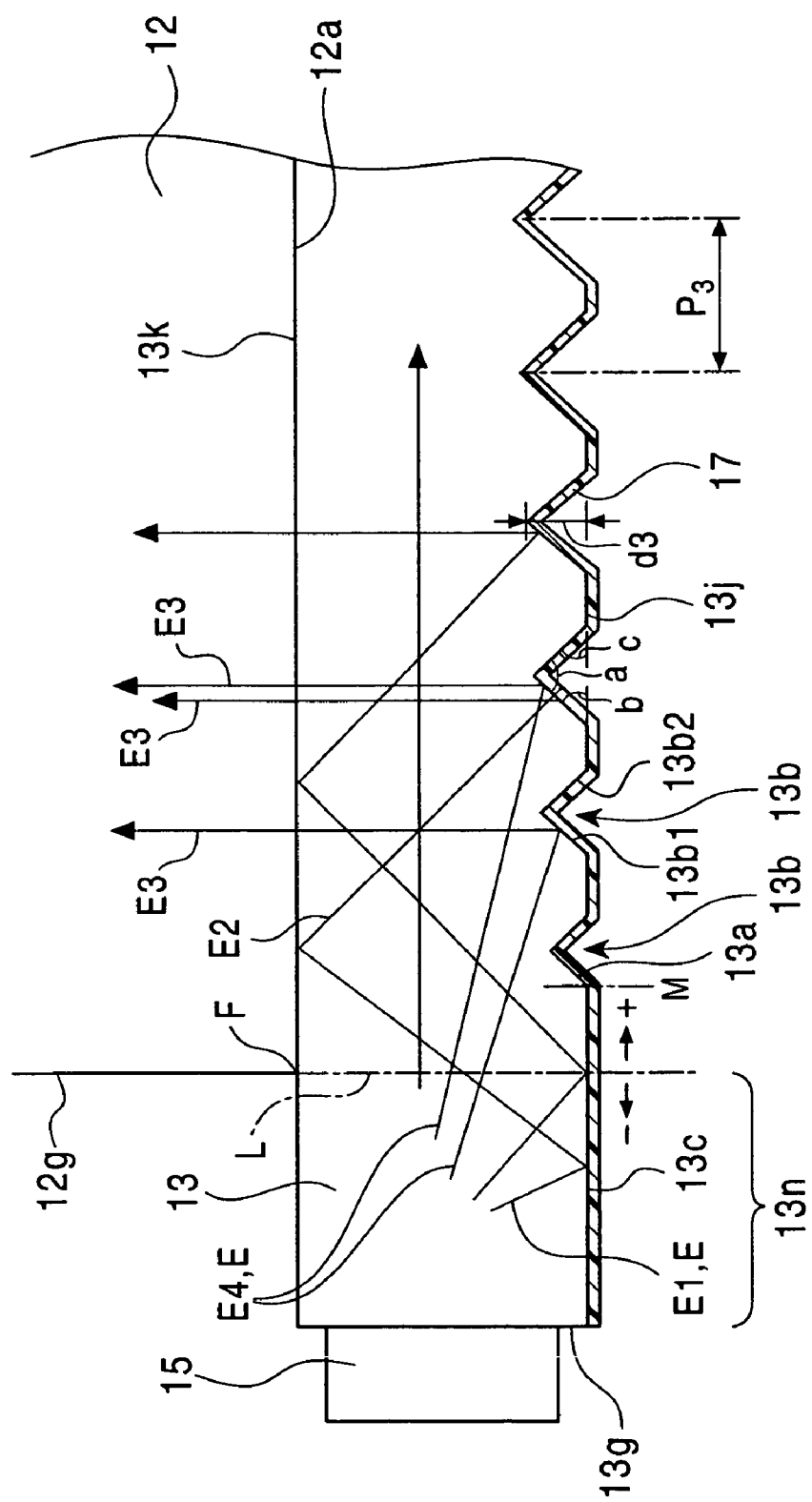
FIG. 4 is an enlarged structural plan view of an intermediate light guide shown in FIG. 2.

FIG. 4 is an enlarged structural plan view of the intermediate light guide 13. As shown in FIGS. 1 and 4, a side face of the intermediate light guide 13 opposing the light incident face 12a of the light guide plate 12 serves as an emergent face 13k for emitting light from the light emitting element 15 to the light guide plate 12 therethrough. An outer side face 13j remote from the emergent face 13k serves as a reflecting face for reflecting light propagating inside the intermediate light guide 13.

As shown in FIG. 4, the outer side face 13j of the intermediate light guide 13 includes a prism face 13a on which a plurality of grooves 13b shaped like a wedge in plan view (in transverse cross section) are arranged in parallel. Light emitted from the light emitting element 15 propagates inside the intermediate light guide 13 in the lengthwise direction thereof, is reflected by inner surfaces of the wedge-shaped grooves 13b, and is emitted toward the light guide plate 12. Each of the wedge-shaped grooves 13b has a pair of inclined faces 13b1 and 13b2 for reflecting light.

The prism face 13a is provided distant from the end face 13g of the intermediate light guide 13 close to the light emitting element 15. Preferably, a formation start position M of the prism face 13a close to the light emitting element 15, from which the prism face 13a extends, is placed at a distance within the range of −1 mm to +0.5 mm from an extension line L of the end face 12g of the light guide plate 12 reaching the outer side face 13j of the intermediate light guide 13, wherein the symbol "−" indicates a side offset from the extension line L toward the light emitting element 15, and the symbol "+" indicates a side offset away from the light emitting element 15, more preferably, within the range of −0.5 mm to +0.5 mm, still more preferably, 0 mm (on the extension line L of the end face 12g of the light guide plate 12 close to the light emitting element 15).

The depth "d3" of the wedge-shaped grooves 13b exponentially or cubicly increases away from the light emitting element 15 for the above-described reason. In the first embodiment, the depth "d3" of the grooves 13b increases away from the light emitting element 15 (the degree of inward protrusion of the grooves 13b increases away from the light emitting element 15) so that light can be uniformly applied onto the side face 12a of the light guide plate 12.

The pitch $P_3$ of the wedge-shaped grooves 13b (or the interval between bottoms of the grooves 13b) exponentially or quadratically decreases away from the light emitting element 15 for the above-described reason. In the first embodiment, the pitch $P_3$ decreases away from the light emitting element 15 in order to increase the amount of light emitted from the emergent face 13k of the intermediate light guide 13, and the uniformity of the amount.

It is preferable, for the above-described reason, that the angle "a" defined by the two inclined faces 13b1 and 13b2 constituting a wedge-shaped groove 13b be within the range of 105° to 115°. It is preferable that the angle "b" of the inclined face 13b1 and the angle "c" of the inclined face 13b2 be more than or equal to 37.5°, or less than or equal to 32.5°. The angle "b" of the inclined face 13b1 and the angle "c" of the inclined face 13b2 may be equal or may be different.

A reflective film 17 made of a high-reflectance metal thin film of Al, Ag, or the like is formed on the entire outer side face 13j of the intermediate light guide 13, that is, on a portion of the outer side face 13j having the prism face 13a and on a non-prism portion 13c between the prism face 13a and the light emitting element 15 in which the prism face 13a is not formed. The reflective film 17 enhances the reflectance of the prism face 13a in order to increase the amount of light reflected toward the emergent face 13k opposing the prism face 13a and to increase the amount of light that enters the light guide plate 12 through the light incident face 12a.

The intermediate light guide 13 may be composed not only of acrylic resin, but also of a transparent resin material, such as a polycarbonate resin or epoxy resin, glass, or the like. The light emitting element 15 may be a white LED (Light Emitting Diode), an organic EL element, or the like as long as it can be disposed at the end face of the intermediate light guide 13.

Figure 5:
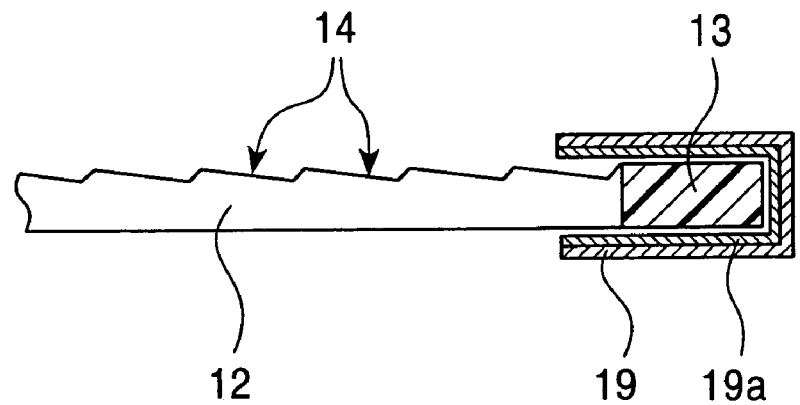
FIG. 5 is a partial sectional view of a front light shown in FIG. 1.

The case member 19 is attached to a side of the front light 10 on which the intermediate light guide 13 is disposed, as shown in FIG. 1. FIG. 5 shows a cross-sectional structure of the front light 10 including the case member 19. As shown in FIG. 5, a reflective film 19a made of a high-reflectance metal thin film of Al, Ag, or the like is formed on an inner surface of the case member 19. Light leaking out from the sides of the intermediate light guide 13 and the light guide plate 12 is reflected by the reflective film 19a, and is thereby caused to enter the intermediate light guide 13 again for use as illumination light.

In the front light 10 of the first embodiment, as shown in FIG. 4, the intermediate light guide 13 protrudes from the light guide plate 12 toward the light emitting element 15 in the direction along the light incident face 12a, and the prism face 13a on the outer side face (reflecting face) 13j of the intermediate light guide 13 is provided distant from the end face 13g close to the light emitting element 15. Therefore, the low-intensity diagonal incident light (deviating from the straight direction) E1 close to the light emitting element 15, of light E emitted from the light emitting element 15, enters the non-prism portion 13c (a portion of the reflecting face 13j between the light emitting element 15 and the prism face 13a), is directed as a delivery component E2 into the intermediate light guide 13, propagates inside the intermediate light guide 13. The delivery component E2 is reflected by the prism face 13a, is emitted from the emergent face 13k, and is introduced as straight incident light E3 into the light guide plate 12. High-intensity straight incident light (traveling in the straight direction and in the directions near the straight direction) E4, of the light E emitted from the light emitting element 15, propagates inside the intermediate light guide 13, is reflected by the prism face 13a, is emitted from the emergent face 13k, and is introduced as straight incident light E3 into the light guide plate 13.

Figure 9:
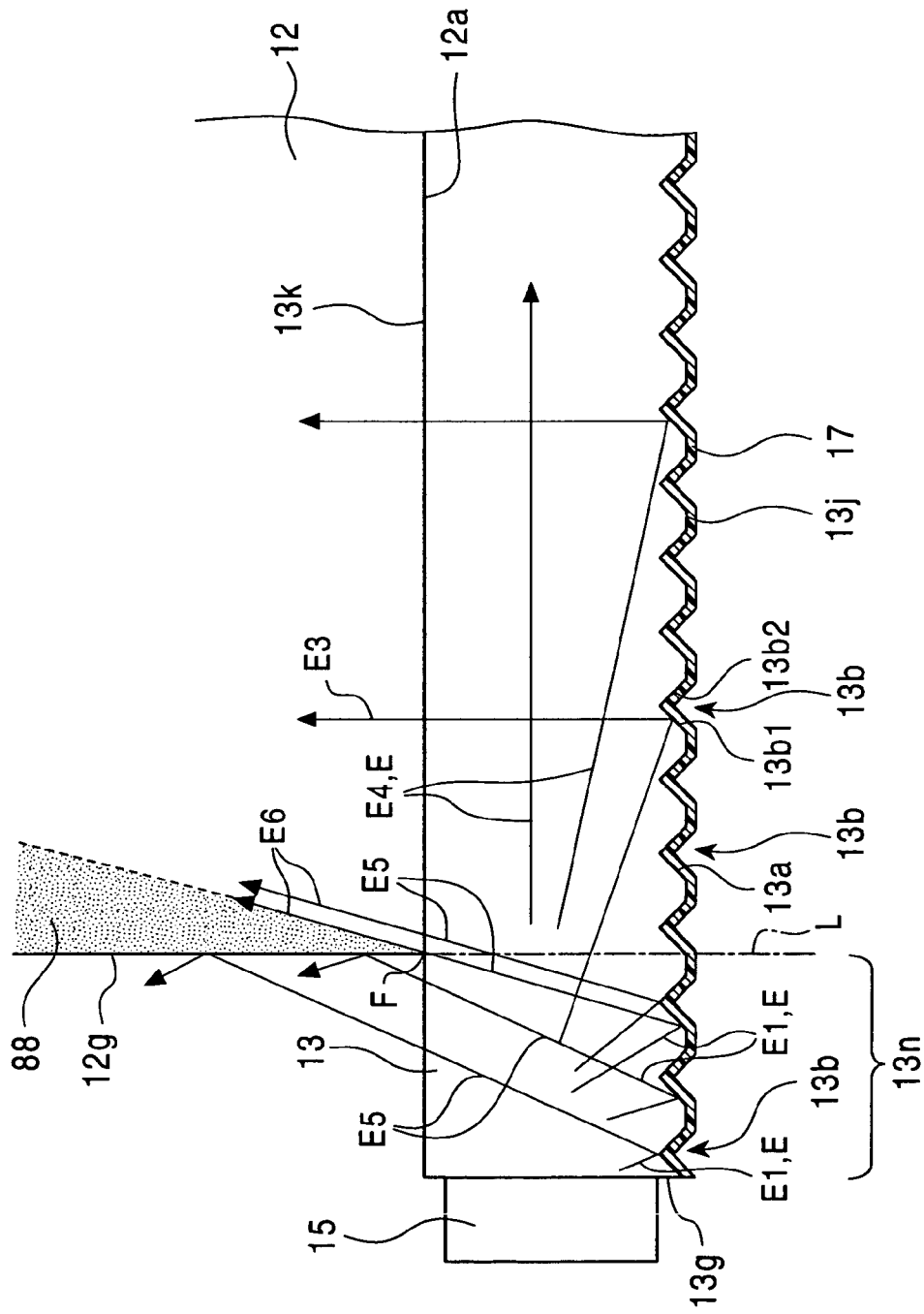
FIG. 9 is an enlarged structural plan view of an intermediate light guide in a front light, in which a prism face is provided on an outer side face of a protruding portion.

In a case in which the intermediate light guide 13 protrudes from the light guide plate 12 toward the light emitting element 15 in the direction along the light incident face 12a and in which the prism face 13a on the outer side face 13j of the intermediate light guide 13 is not distant from the end face 13g of the intermediate light guide 13 close to the light emitting element 15, a dark portion formed near the end face 12g of the light guide plate 12 close to the light emitting element 15 can be made smaller than in the conventional illumination device. However, depending on the condition for forming the prism face 13a on the outer side face 13j of the protruding portion 13n of the intermediate light guide 13, for example, when the prism face 13a reaches the end face 13g close to the light emitting element 15 (in other words, the prism face 13a is close to the light emitting element 15), as shown in FIG. 9, while diagonal incident light E1 from the light emitting element 15 has a low intensity, it is reflected as diagonal reflected light E5 by the prism face 13a toward the emergent face 13k of the intermediate light guide 13.

Light components of the diagonal reflected light E5, which emerge through the intersection F of the end face 12g of the light guide plate 12 and the emergent face 13k of the intermediate light guide 13 and from the side offset from the intersection F away from the light emitting element 15, is introduced as diagonal incident light E6 into the light guide plate 12. Since light components emitted from the side offset from the intersection F toward the light emitting element 15 do not enter the light guide plate 12, light and dark are formed, respectively, on both sides of the diagonal incident light E6 passing through the intersection F, and a triangular dark portion 88 is sometimes formed near the end face 12g of the light guide plate 12 close to the light emitting element 15. Furthermore, the diagonal reflected light E5 emitted from the side offset from the intersection F toward the light emitting element 15 is sometimes diffused by the end face 12g of the light guide plate 12, which causes bright lines and worsens the appearance.

In contrast, in the front light 10 of the first embodiment, the intermediate light guide 13 protrudes from the light guide plate 12 toward the light emitting element 15 in the direction along the light incident face 12a, and the prism face 13a is provided on the outer side face (reflecting face) 13j of the intermediate light guide 13 distant from the end face 13g close to the light emitting element 15. Therefore, it is possible to prevent diagonal incident light from entering the light guide plate 12, and to prevent diagonal reflected light emitted from the side offset toward the light emitting element 15 from the intersection F of the end face 12g of the light guide plate 12 and the emergent face 13k of the intermediate light guide 13. Consequently, a dark portion is not formed near the end face 12g of the light guide plate 12 close to the light emitting element 15, variations in luminance in the diagonal direction and bright lines due to the diagonal reflected light are reduced, and the appearance is improved.

Accordingly, even when the front light 10 of the first embodiment uses a single light source, the emergent light is highly uniform, and a large area can be uniformly and brightly illuminated with low power consumption.

While the front light 10 of the first embodiment has the single light emitting element 15 at one end face in the lengthwise direction of the intermediate light guide 13, of course, another light emitting element may be disposed at the other end face 13h of the intermediate light guide 13. In this case, the other end face 13h may protrude from the other end face 12h of the light guide plate 12 toward the light emitting element. Moreover, it is preferable that the prism face 13a be formed distant from the other end face 13h of the intermediate light guide 13.

Figure 10:
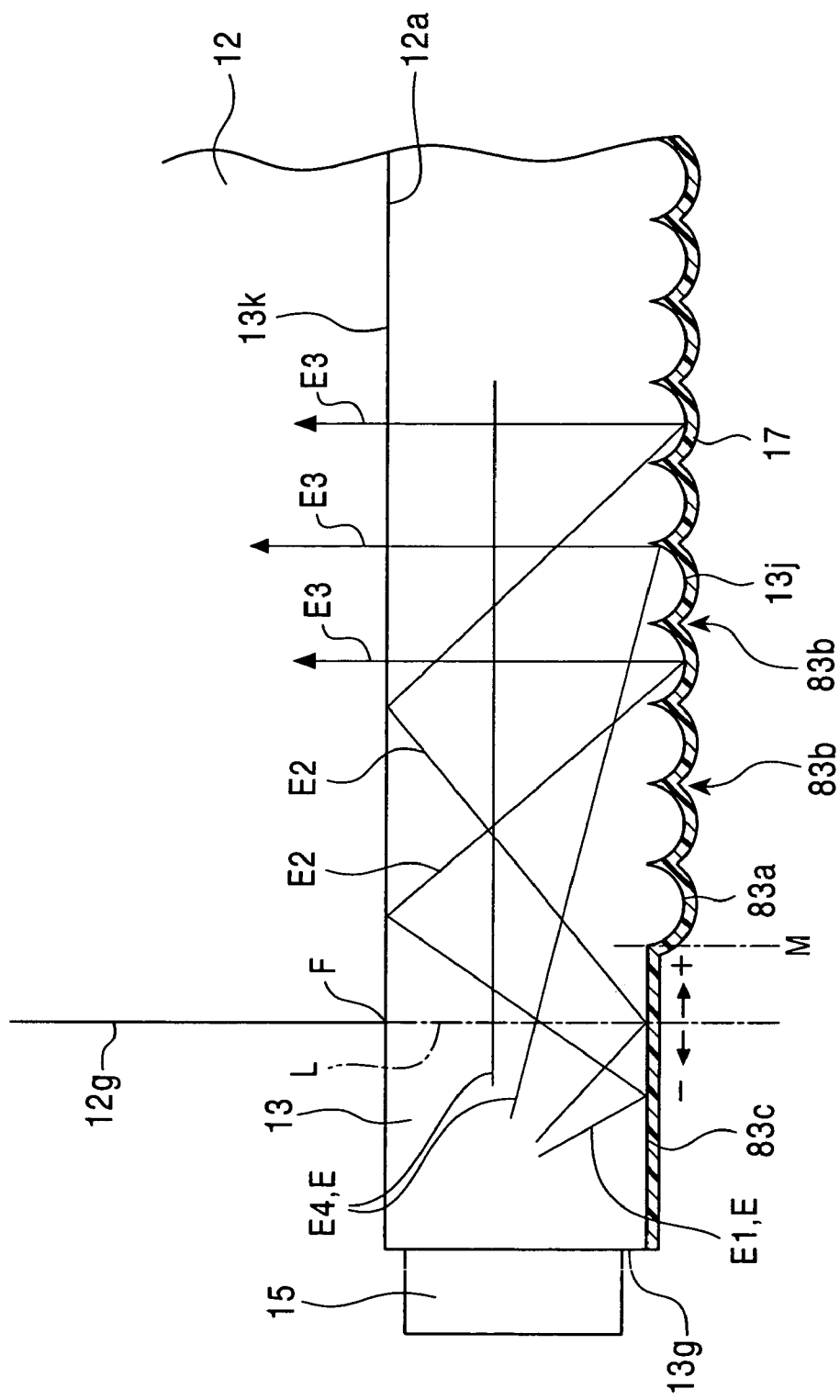
FIG. 10 is an enlarged structural plan view of another example of an intermediate light guide provided in the front light of the first embodiment.

While the prism face 13a is provided on the outer side face 13j of the intermediate light guide 13 distant from the end face 13g, and the reflective film 17 is provided on the prism face 13a and on the non-prism face 13c in the first embodiment, the prism face 13a may be replaced with an uneven face 83a having a plurality of minute irregularities, as shown in FIG. 10, and a reflective film 17 may be provided on the uneven face 83a and an even face 83c (an outer side face of the protruding portion of the intermediate light guide 13). This case also provides advantages similar to those in the first embodiment. The uneven face 83a has a plurality of grooves 83b of substantially arc-shaped cross section formed on the outer side face 13*j*, and the joints of the grooves 83*b* are not shaped like a curved face. Therefore, in the transverse cross section of the uneven face 83*a*, curves are not formed continuously.

The uneven face 83*a* may be replaced with an uneven face having a cross section including continuous curves. In this case, the joints of the grooves 83*b* are shaped like a curved face.

When forming the above-described uneven face 83*a* having a plurality of minute irregularities, it is preferable to set the inclination angle of the curves of the uneven face 83*a* (the inclination angle of the tangents to small portions of the curves) within a fixed range, because the range of spreading of the emergent light from the intermediate light guide 13 to the light guide plate 12 in plan view can be controlled to be within a predetermined range. Preferably, the diffusing direction of the intermediate light guide 13 for effectively emitting light to the light guide plate 12 is close to the direction parallel to the end face 12*g* of the light guide plate 12, or close to the direction perpendicular to the lengthwise direction of the outer side face 13*j* of the intermediate light guide 13 having the prism face 83*a*.

[Liquid Crystal Display Unit]

The liquid crystal display unit 20 is a reflective passive-matrix liquid crystal display unit capable of color display. As shown in FIG. 3, a liquid crystal layer 23 is held between an upper substrate 21 and a lower substrate 22 opposing each other. A plurality of transparent electrodes 26*a* shaped like a strip in plan view and extending in the right-left direction in the figure, and an alignment film 26*b* are sequentially formed on the inner side of the upper substrate 21 (the side close to the liquid crystal layer 23). A reflective layer 25, a color filter layer 29, a plurality of transparent electrodes 28*a* shaped like a strip in plan view, and an alignment film 28*b* are sequentially formed on the inner side of the lower substrate 22 (the side close to the liquid crystal layer 23).

The transparent electrodes 26*a* of the upper substrate 21 and the transparent electrodes 28*a* of the lower substrate 22 are shaped like a flat strip, and are arranged in stripes in plan view. The extending direction of the transparent electrodes 26*a* is orthogonal to the extending direction of the transparent electrodes 28*a* in plan view. Therefore, one dot of the liquid crystal display unit 20 is formed at the intersection of one transparent electrode 26*a* and one transparent electrode 28*a*, and any one of color filters of three colors (red, green, and blue), which will be described later, is disposed corresponding to each dot. Three dots of R (red), G (green), and B (blue) constitute one pixel 20*c* of the liquid crystal display unit 20, as shown in FIG. 3. Multiple pixels 20*c* are arranged in a matrix in plan view inside the display region 20D, as shown in FIG. 2.

In the color filter layer 29, color filters 29R, 29G, and 29B, respectively, of red, green, and blue are arranged periodically. Each color filter is disposed under the corresponding transparent electrode 28*a*. A set of the color filters 29R, 29G, and 29B is placed at each pixel 20*c*. By controlling the driving of the electrodes corresponding to the color filters 29R, 29G, and 29B, a color displayed at the pixel 20*c* is controlled.

In the liquid crystal display device of the first embodiment, the extending direction of the prism grooves 14 formed on the light guide plate 12 of the front light 10 intersects the arranging direction of the pixels 20*c* in the liquid crystal display unit 20. That is, the direction of repetition of R, G, and B in the color filter layer 29 that provides a periodic pattern in the liquid crystal display unit 20 is not parallel to the extending direction of the prism grooves 14 in order to prevent moiré fringese due to optical interference therebetween.

Figure 6:
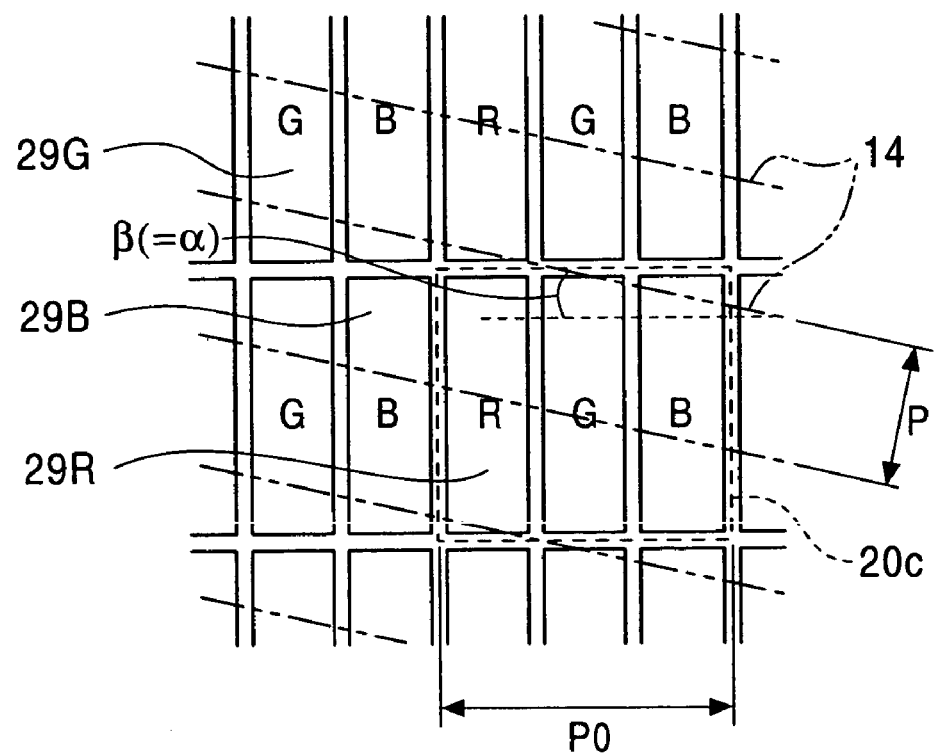
FIG. 6 is an enlarged structural plan view of pixels in a liquid crystal display unit shown in FIG. 2.

FIG. 6 is an enlarged structural plan view of a group of pixels adjoining in the liquid crystal display unit 20 shown in FIG. 2. In the liquid crystal display unit 20, a plurality of pixels 20*c* are formed in a matrix in plan view, as shown in the figure. Each of the pixels 20*c* includes a set of red, green, and blue color filters 29R, 29G, and 29B. As shown in FIG. 6, the extending direction of the prism grooves 14 of the front light 10 shown by two-dot chain lines is inclined at an inclination angle $\beta$ to the arranging direction (right-left direction in the figure) of the pixels 20*c* of the liquid crystal display unit 20.

Preferably, the inclination angle $\beta$ of the prism grooves 14 relative to the arranging direction of the pixels 20*c* (right-left direction in the figure) is within the range of 0° to 150°. By setting such a range, moiré fringese can be prevented from being produced by optical interference with the periodic structure of the pixels 20*c* in the liquid crystal display unit 20. The effect of lessening the moiré fringes tend to be small outside the above range. It is more preferable that the inclination angle $\beta$ be within the range of 6.5° to 8.5°. By setting such a range, the effect of preventing the moire can be enhanced. In a case in which there is no fear that moire will occur, the inclination angle $\beta$ may be set at 0°.

In the liquid crystal display device of the first embodiment, since the side face 12*a* of the light guide plate 12 in the front light 10 and the pixel-arranging direction in the liquid crystal display unit 20 are parallel to each other, as shown in FIG. 2, the angle $\alpha$ defined by the extending direction of the prism grooves 14 and the side face 12*a* coincides with the angle $\beta$ defined by the extending direction of the prism grooves 14 and the arranging direction of the pixels 20*c*. In a case in which the side face 12*a* is not parallel to the arranging direction of the pixels 20*c*, the inclination angles $\alpha$ and $\beta$ are different. In this case, it is better, in order to reduce moiré fringese, to set the inclination angle $\beta$ within the above range, in preference to the inclination angle $\alpha$. Since the extending direction of the prism grooves 14 is determined by setting the inclination angle $\beta$, the angle of the side face 12*a* relative to the prism grooves 14 is adjusted to be within the above range of the inclination angle $\alpha$ in order to achieve a uniform distribution of light emitted from the light guide plate 12.

The reflective layer 25 includes an organic film made of an acrylic resin material or the like, and a reflective metal film made of a high-reflectance metal, such as Al or Ag, on the organic film. A plurality of recesses having light reflectivity are provided on a surface of the reflective film 25. The organic film serves to give a predetermined surface shape to the metal reflective film.

Since the liquid crystal display device of the first embodiment has the front light 10 that can uniformly illuminate a large area with high intensity, the entire display region 20D is uniformly and brightly illuminated, and a superior display quality can be achieved. Even when a single light emitting element is used as the illumination device, the uniformity of brightness does not decrease, and display visibility is high. Therefore, a superior display quality and low power consumption are possible.

[Active-Matrix Liquid Crystal Display Unit]

While the liquid crystal display unit 20 in the above embodiment is of a passive-matrix type, the present invention is also applicable to an active-matrix liquid crystal display unit. Since the planar structure of the liquid crystal display unit in this case is similar to that of the liquid crystal display unit 20 of the above embodiment shown in FIG. 2, the following description will be given also with reference to FIG. 2. That is, the liquid crystal display unit of this type includes a plurality of pixels 20*c* arranged in a matrix in plan view.

Figure 7:
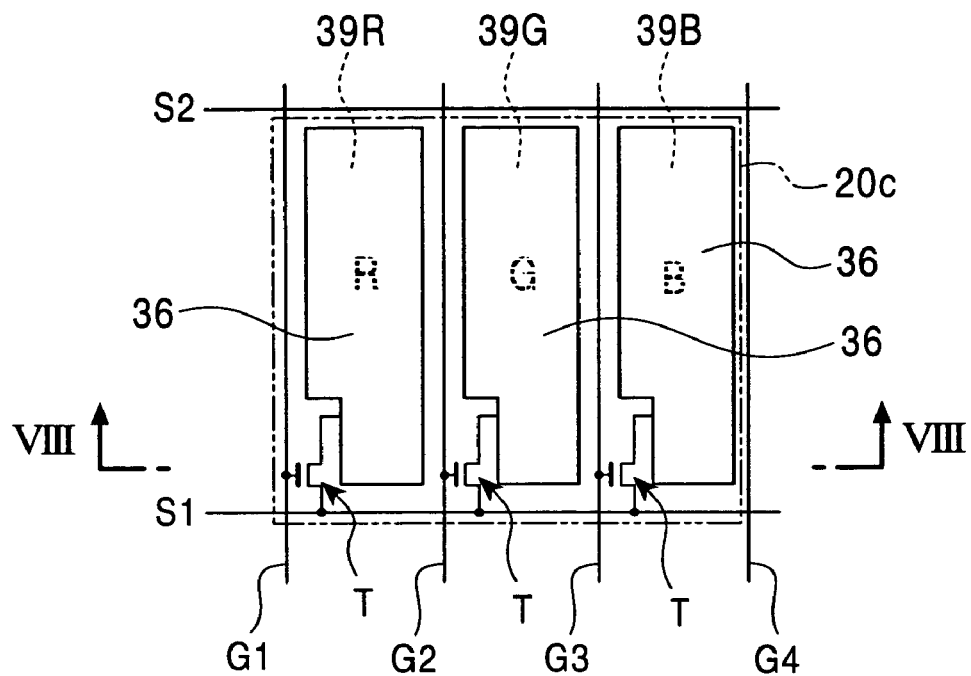
FIG. 7 is an enlarged structural plan view of pixels in an active-matrix liquid crystal display unit.
Figure 8:
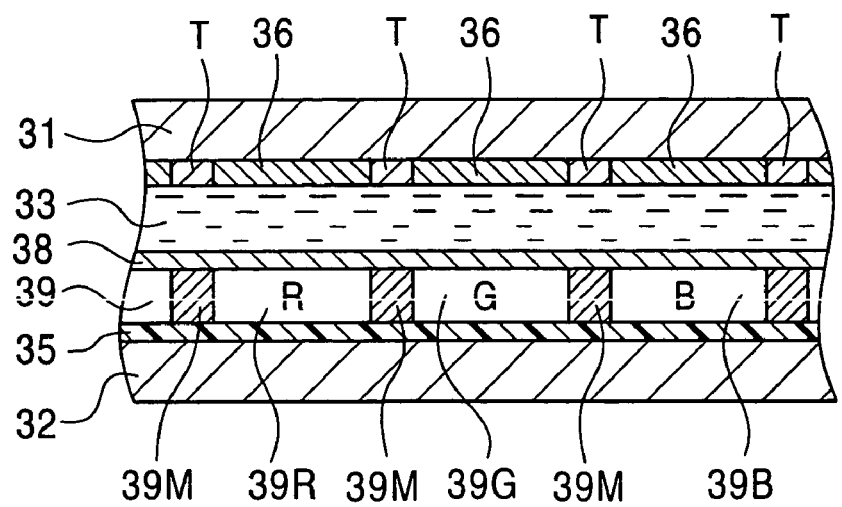
FIG. 8 is a cross-sectional view, taken along line VIII—VIII in FIG. 7.

FIG. 7 is a structural plan view of the pixels 20c formed in the liquid crystal display unit of this type, and FIG. 8 is a sectional structural view, taken along line VIII—VIII in FIG. 7. In a liquid crystal display unit shown in FIGS. 7 and 8, a liquid crystal layer 33 is held between an upper substrate 31 and a lower substrate 32 opposing each other. A plurality of substantially rectangular transparent electrodes 36 arranged in a matrix in plan view, and pixel-switching transistor elements T formed corresponding to the transparent electrodes 36 are provided on an inner side of the upper substrate 31 (side close to the liquid crystal layer 33). A reflective layer 35, a color filter layer 39 formed on the reflective layer 35, and a transparent electrode 38 formed over the entire surface of the color filter 39 are provided on an inner side of the lower substrate 32 (side close to the liquid crystal layer 33). A region in which three transparent electrodes 36 corresponding R, G, and B are formed corresponds to one pixel 20c. In FIG. 7, the transistor elements T are each shown by an equivalent circuit diagram for easy viewing.

The transistor elements T for switching the transparent electrodes 36 are connected at one end to the transparent electrodes 36, and are connected at the other two ends to scanning lines G1 to G3 extending in the up-down direction in the figure between the transparent electrodes 36, and to a signal line S1 extending in the right-left direction in the figure. The color filters 39R, 39G, and 39B are disposed in the color filter 39 of the lower substrate 32 at positions corresponding to the transparent electrodes 36, and a black matrix 39M shaped like a grid in plan view is disposed between the adjoining color filters 39R, 39G, and 39B. Although not shown, a black matrix shaped like a grid in plan view is also formed on the inner side of the upper substrate 31 to surround the transparent electrodes 36 so that light incident from the upper side does not enter the transistor elements T, and the scanning lines and the signal lines connected thereto.

The reflective layer 35 may be similar to the reflective layer 25 in the above embodiment.

The liquid crystal display unit of this type performs display by controlling the potential of each transparent electrode 36 by the transistor element T and controlling the state of light transmitted through the liquid crystal layer 33 between the transparent electrode 36 and the transparent electrode 38 in the lower substrate 32.

In the active-matrix liquid crystal display unit, a light-shielding black matrix is formed like a grid in plan view to surround the transparent electrodes 36, and the display contrast can be enhanced. Therefore, the periodic pattern of the pixels 20c tends to be clearer than in the passive-matrix liquid crystal display unit. That is, optical interference between the periodic arrangement of the pixels 20c and the prism grooves 14 of the front light 10 is prone to occur. In the liquid crystal display device of the first embodiment, since the prism grooves 14 extend in a direction intersecting the arranging direction of the pixels 20c, the above interference is inhibited, and visibility is effectively prevented from being reduced by moiré fringese. Even when the liquid crystal display device of the present invention adopts an active-matrix liquid crystal display unit in this way, moiré fringes are not caused in the display region, and a uniform and bright display of high quality is possible.

While the color filter layer 39 is formed on the reflective layer 35 in FIG. 8, pixel-switching electrodes may be formed in the lower substrate 32 to also function as a reflective layer, and a color filter layer may be formed in the upper substrate 31.

Second Embodiment

Figure 11:
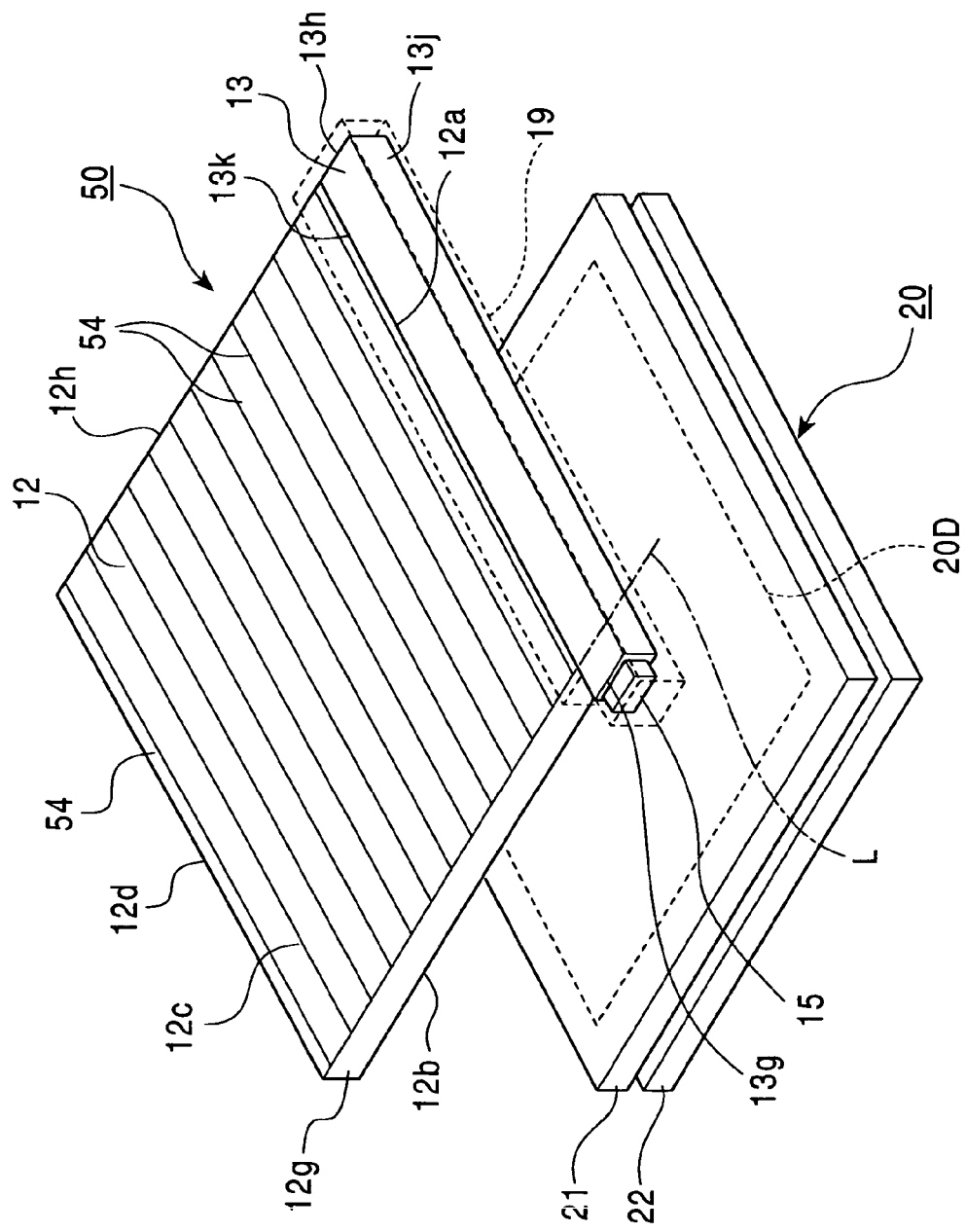
FIG. 11 is a perspective structural view of a liquid crystal display device according to a second embodiment of the present invention.

A liquid crystal display device according to a second embodiment of the present invention will now be described with reference to FIG. 11. FIG. 11 is a perspective structural view of the liquid crystal display device of the second embodiment.

A front light 50 provided in the liquid crystal display device of the second embodiment is different from the front light 10 of in the first embodiment in that the extending direction of prism grooves 54 formed on a light guide plate 12 does not intersect a light incident face 12a, that is, in that the extending direction of the prism grooves 54 is parallel to the light incident face 12a. Since other structures are similar to those in the front light 10 shown in FIGS. 1 to 3, detailed descriptions thereof are omitted below. Since the basic configuration of a liquid crystal display unit 20 is equivalent to that in the liquid crystal display unit shown in FIGS. 1 to 3, a detailed description thereof is also omitted. In the liquid crystal display unit 20 in the second embodiment, a diffusing layer (not shown) is provided between the light guide plate 12 and an upper substrate of the liquid crystal display unit 20 so that a regular pattern of the liquid crystal display unit 20 is diffused at a degree such as not to be visible. For example, the diffusing layer is laid on a retardation film or a polarizer provided on the upper substrate of the liquid crystal display unit 20.

Since a prism face provided on an outer side face 13j of an intermediate light guide 13 is also distant from an end face 13g of the intermediate light guide 13 close to a light emitting element 15 in the front light 50 of the second embodiment, even when the illumination device has the single light emitting element 15, it is superior in brightness uniformity, display visibility, luminance, and display quality, and reduces the power consumption.

Third Embodiment

A liquid crystal display device according to a third embodiment of the present invention will now be described. FIG. 12 is an enlarged structural plan view showing the principal part of a front light provided in the liquid crystal display device of the third embodiment.

A front light 60 provided in the liquid crystal display device of the third embodiment is different from the front light 10 of the first embodiment in that a prism face 13a is also formed on an outer side face 13j of a protruding portion 13n of an intermediate light guide 13, that is, in that the prism face 13a provided on the outer side face 13j of the intermediate light guide 13 close to a light emitting element 15 reaches an end face 13g of the intermediate light guide 13 close to the light emitting element 15 (in other words, the distance between the formation start position of the prism face 13a on the side of the light emitting element 15, and the end face 13g is substantially zero). Since other structures are similar to those in the front light 10 shown in FIGS. 1 to 3, detailed descriptions thereof are omitted. Since a liquid crystal display unit 20 is equivalent to the liquid crystal display unit shown in FIGS. 1 to 3, a detailed description thereof is omitted.

Figure 13A:
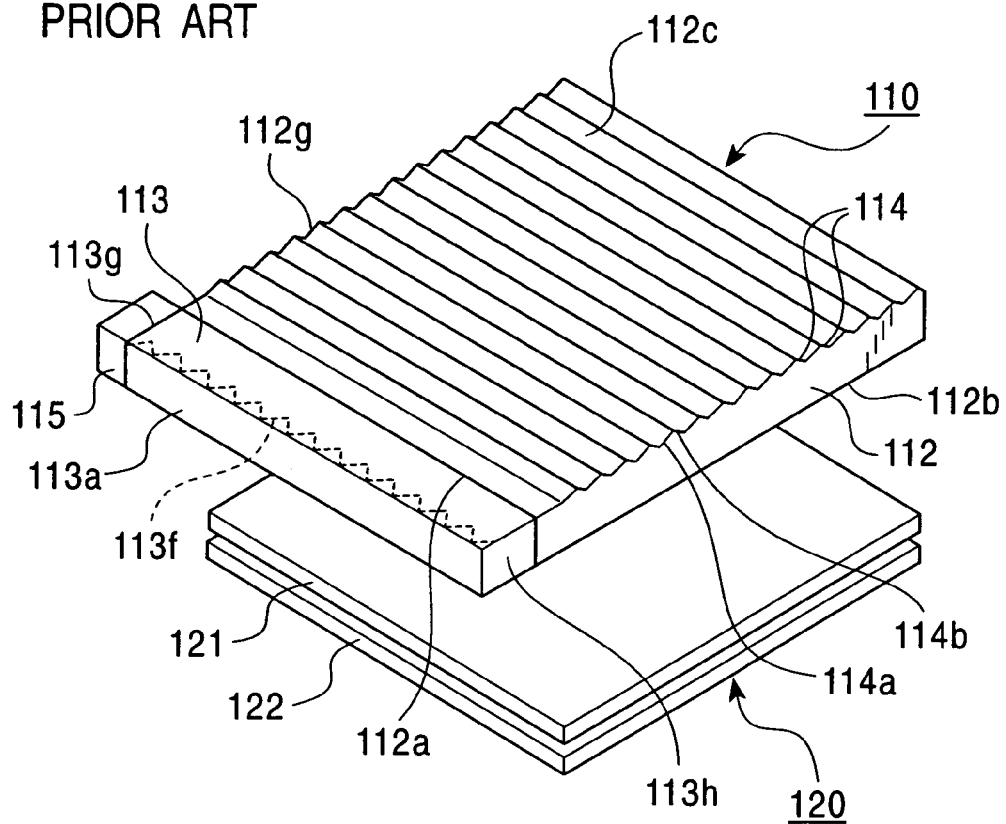
FIG. 13A is a perspective view of a conventional liquid crystal display device.
Figure 13B:
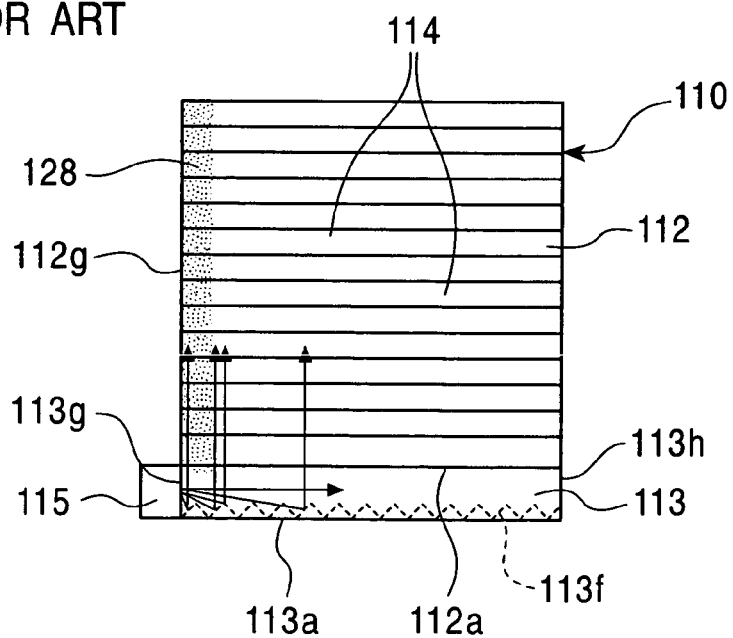
FIG. 13B is a plan view of a front light shown in FIG. 13A.

In the front light 60 of the third embodiment having the above configuration, the intermediate light guide 13 protrudes from the light guide plate 12 toward the light emitting element 15 in the direction along a light incident face 12a of the light guide plate 12. Even when a single light emitting element 15 is disposed on one end face 13g of the intermediate light guide 13, after low-intensity diagonal incident light E1 close to the light emitting element 15, of light introduced from the light emitting element 15 into the intermediate light guide 13, is reflected by the prism face 13a of the protruding portion 13n of the intermediate light guide 13, it hardly enters the light guide plate 12. High-intensity straight incident light E4 propagates inside the intermediate light guide 13, and most thereof is reflected by the prism face 13a, is emitted from an emergent face 13k of the intermediate light guide 12, and is introduced as straight incident light E3 into the light guide plate 12. Compared with the conventional front light shown in FIG. 13 in which the end face 113g of the intermediate light guide 113 close to the light emitting element is flush with the end face 112g of the light guide plate 112 close to the light emitting element, a dark portion formed near the end face 12g can be reduced, the uniformity of light emitted from the emergent surface of the light guide plate 12 can be enhanced, and bright illumination and low power consumption are possible.

EXAMPLE

The present invention will be described below in more detail in conjunction with an example. It should be noted that the following example does not limit the scope of the present invention.

(Experiment)

In this experiment, in the front light 50 of the liquid crystal display device shown in FIG. 11, the light guide plate 12 was made of an acrylic resin rectangular plate having a length of 66.2 mm along the light incident face 12a, a width of 48 mm along the end face 12g, and a thickness of 0.975 mm, the pitch P of the prism grooves 14 formed on the reflecting surface 12c of the rectangular plate was set at 0.919 mm, the inclination angle $\theta_1$ of the gently inclined faces 14a was set at 2.6°, and the inclination angle $\theta_2$ of the sharply inclined faces 14b was set at 41°. A white LED (NSCW215T from Nichia Corporation) was used as the light emitting element 15, and the intermediate light guide 13 is made of an acrylic resin quadratic prism having a length of 68 mm along the outer side face 13j, a width of 3 mm along the end face 13g, and a thickness of 0.9 mm. The pitch $P_3$ of the wedge-shaped grooves 13b was decreased within the range of 0.36 mm to 0.24 mm away from the light emitting element 15, and the depth "d3" of the wedge-shaped grooves 13b was increased within the range of 7.4 μm to 73.5 μm away from the light emitting element 15. The angle "a" defined by the inclined faces 13b1 and 13b2 was set at 110°, the angle "b" of the inclined faces 13b1 was set at 35°, and the angle "c" of the inclined faces 13b2 was set at 35°. The formation start position M of the prism face 13a on the outer side face 13j close to the light emitting element 15 was changed within the range of −1 mm to +0.5 mm to obtain various front lights. The symbol "−" indicates a side offset toward the light emitting element 15 from the extension line L of the end face 12g of the light guide plate 12 reaching the outer side face 13j of the intermediate light guide 13, and the symbol "+" indicates a side offset from the extension line L away from the light emitting element 15.

As a comparative example, a front light was produced which was similar to the above front light except that the end face 13g of the intermediate light guide 13 close to the light emitting element 15 was flush with the end face 12g of the light guide plate 12 close to the light emitting element 15 and that the formation start position M of the prism face 13a was set at 0 mm by forming the prism face 13a over almost the entirety of the outer side face 13j of the intermediate light guide 13.

The obtained front lights were placed on the liquid crystal display unit 20 shown in FIG. 11, and the appearances thereof were observed in a lighted state from the side of the reflecting surface 12c. The liquid crystal display unit 20 had a planar size of approximately 70 mm×50 mm. The results of observation are shown in the following Table 1.

TABLE 1

| Formation Start Position of Prism Face | Appearance |
|---|---|
| M < −1 mm | C: Bright lines seen (diffusion at end face of light guide plate), no strip-shaped dark portion |
| −1 mm ≦ M ≦ −0.5 mm | B: Bright lines seen slightly no strip-shaped dark portion |
| −0.5 mm ≦ M ≦ +0.5 mm | A: Good appearance, no dark portion, no bright line |
| +0.5 mm < M | D: Dark lines seen |
| M = 0 mm (End face of light guide plate and end face of intermediate light guide are flush with each other) | D: Strip-shaped dark portion seen |

As shown in the result in Table 1, a strip-shaped dark portion was formed near the end face of the light guide plate, and the appearance was bad in the front light as the comparative example in which the end face of the light guide plate and the end face of the intermediate light guide close to the light emitting element were flush with each other, and the formation start position M of the prism face was set at 0 mm.

In the front light having the light guide plate in which the formation start position M of the prism face exceeded +0.5 mm, dark lines were formed, and the appearance was bad.

In the front light in which the formation start position M of the prism face was less than −1 mm, bright lines were formed because the distance between the prism face and the light emitting element was too short. However, the appearance was better than in the comparative example.

In the front light having the intermediate light guide in which the formation start position M of the prism face was set at a distance within the range of −0.5 mm to +0.5 mm, bright lines were slightly seen, but a strip-shaped dark portion was not seen and the appearance was good.

In the front light having the intermediate light guide in which the prism-face formation start position M is set at a distance within the range of −0.5 mm to +0.5 mm, a bright line and a dark portion were not seen, and the appearance was superior.

As is evident from the above results, the appearances of the front lights in which the intermediate light guide protrudes from the light guide plate toward the light emitting element in the direction along the light incident face of the light guide plate are better than in the comparative example. Preferably, the formation start position of the prism face or the uneven face provided on the outer side face of the intermediate light guide is disposed at a distance within the range of −1 mm to +0.5 mm, more preferably, within the range of −0.5 mm to +0.5 mm.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An illumination device comprising:
   a light guide plate;
   an intermediate light guide disposed along one side face of the light guide plate; and
   a light emitting element disposed at an end face in a lengthwise direction of the intermediate light guide,
   wherein the side face of the light guide plate serves as a light incident face from which light is introduced, light emitted from the light emitting element is introduced into the light guide plate through the intermediate light guide and the light incident face, and the light propagating inside the light guide plate is emitted from one surface of the light guide plate,
   wherein the intermediate light guide protrudes from the light guide plate in a direction along the light incident face of the light guide plate toward the light emitting element, a side face of the intermediate light guide opposing the side face of the light guide plate serves as an emergent face from which the light from the light emitting element emerges toward the light guide plate, and an outer side face of the intermediate light guide remote from the emergent face serves as a reflecting face for reflecting the light propagating inside the intermediate light guide,
   wherein the outer side face of the intermediate light guide is provided with at least one of a plurality of grooves of wedge-shaped cross section or a plurality of minute irregularities provided distant from the end face of the intermediate light guide, and a reflective film formed on the at least one of grooves or irregularities, and
   wherein the at least one of grooves or irregularities on the outer side face of the intermediate light guide extend from a position at a distance within the range of −1 mm to +0.5 mm from an extension line of an end face of the light guide plate close to the light emitting element, the extension line reaching the outer side face of the intermediate light guide, when the symbol "−" indicates a side offset from the extension line toward the light emitting element, and the symbol "+" indicates a side offset from the extension line away from the light emitting element.

2. An illumination device according to claim 1, wherein the outer side face of the intermediate light guide is provided with a prism face having the plurality of grooves.

3. An illumination device according to claim 2, wherein the prism face on the outer side face of the intermediate light guide extends from a position at a distance within the range of 0.5 mm to +0.5 mm from the extension line.

4. An illumination device according to claim 2, wherein the prism face on the outer side face of the intermediate light guide extends from the extension line.

5. An illumination device according to claim 2, wherein a pitch of the grooves one of exponentially and quadratically decreases away from the light emitting element.

6. An illumination device according to claim 2, wherein a depth of the grooves one of exponentially and cubicly increases away from the light emitting element.

7. An illumination device according to claim 2, wherein each of the grooves has a pair of inclined faces for reflecting light, and an angle defined by the inclined faces is within the range of 105° to 115°.

8. An illumination device according to claim 1, wherein the outer side face of the intermediate light guide is provided with an uneven face having the plurality of minute irregularities.

9. An illumination device according to claim 5, wherein the uneven face on the outer side face of the intermediate light guide extends from a position at a distance within the range of 0.5 mm to +0.5 mm from the extension line.

10. An illumination device according to claim 5, wherein the uneven face on the outer side face of the intermediate light guide extends from the extension line.

11. An illumination device according to claim 1, wherein another surface of the light guide plate is provided with a plurality of prism grooves arranged in stripes in plan view and having gently inclined faces and sharply inclined faces inclined more sharply than the gently inclined faces.

12. An illumination device according to claim 11, wherein the extending direction of the prism grooves in the light guide plate intersects the light incident face.

13. A liquid crystal display device comprising:
    an illumination device; and
    a liquid crystal display unit to be illuminated by the illumination device,
    wherein the illumination device comprises:
    a light guide plate;
    an intermediate light guide disposed along one side face of the light guide plate; and
    a light emitting element disposed at an end face in a lengthwise direction of the intermediate light guide,
    wherein the side face of the light guide plate serves as a light incident face from which light is introduced, light emitted from the light emitting element is introduced into the light guide plate through the intermediate light guide and the light incident face, and the light propagating inside the light guide plate is emitted from one surface of the light guide plate,
    wherein the intermediate light guide protrudes from the light guide plate in a direction along the light incident face of the light guide plate toward the light emitting element, a side face of the intermediate light guide opposing the side face of the light guide plate serves as an emergent face from which the light from the light emitting element emerges toward the light guide plate, and an outer side face of the intermediate light guide remote from the emergent face serves as a reflecting face for reflecting the light propagating inside the intermediate light guide,
    wherein the outer side face of the intermediate light guide is provided with at least one of a plurality of grooves of wedge-shaped cross section or a plurality of minute irregularities provided distant from the end face of the intermediate light guide, and a reflective film formed on the at least one of grooves or irregularities, and
    wherein the at least one of grooves or irregularities on the outer side face of the intermediate light guide extend from a position at a distance within the range of −1 mm to +0.5 mm from an extension line of an end face of the light guide plate close to the light emitting element, the extension line reaching the outer side face of the intermediate light guide, when the symbol "−" indicates a side offset from the extension line toward the light emitting element, and the symbol "+" indicates a side offset from the extension line away from the light emitting element.

* * * * *